Patented Mar. 25, 1941

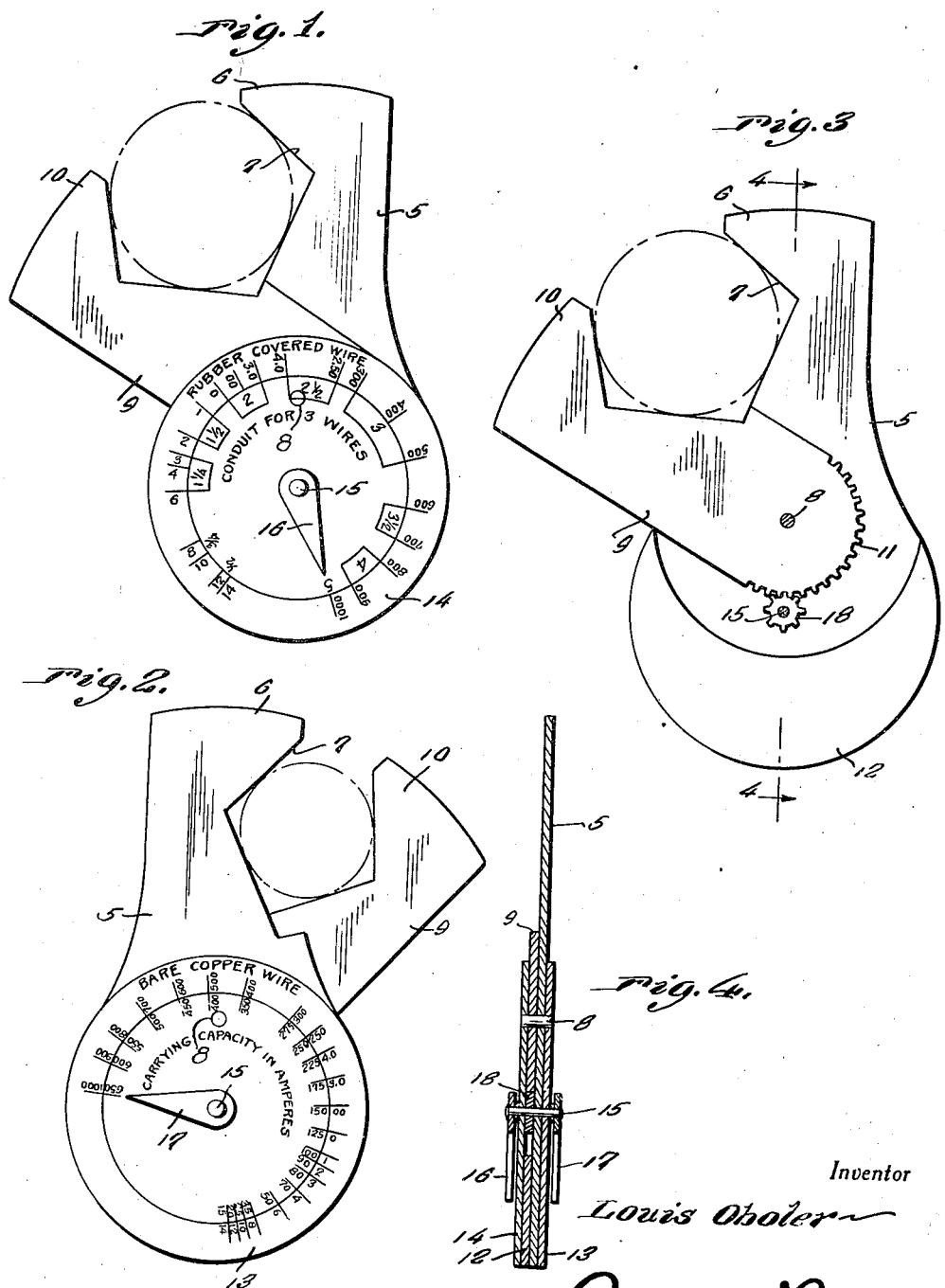

2,236,443

UNITED STATES PATENT OFFICE 2,236,443

GAUGE

Louis Oboler, Chicago, Ill.

Application March 9, 1939, Serial No. 260,842

1 Claim. (Cl. 33—178)

The present invention relates to new and useful improvements in gauges, particularly electric conductor wire gauges, and has for its primary object to provide, in a manner as hereinafter set forth, a device of this character embodying a novel construction, combination and arrangement of parts through the medium of which the diameter and carrying capacity of an electric wire or cable may be readily determined.

Another object of the invention is to provide means whereby the size of conductor wire conduits may be readily determined simultaneously with the gauging of the conductor wire or cable.

Further objects of the invention are to provide a gauge of the aforementioned character which will be comparatively simple in construction, strong, durable, highly efficient and reliable in use, compact, light in weight, and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a side elevational view of my invention, showing one of the dials.

Figure 2 is a side elevational view showing the other dial.

Figure 3 is a vertical transverse sectional view, and

Figure 4 is a vertical transverse sectional view taken substantially on the line 4—4 of Fig. 3.

Referring now to the drawing in detail it will be seen that the numeral 5 designates a flat plate, constructed of metal or other suitable material, the bottom portion of which is substantially circular while the top portion thereof is formed to provide a jaw 6 having a V-shaped notch 7 cut or formed therein.

A pin 8 passes through an opening in the plate 5 and has journalled thereon a flat plate 9 provided with a V-shaped notched jaw 10 at one end portion while its other end portion is curved to provide a segmental gear 11.

The flat plate 5 has secured thereto on one side thereof at the bottom end portion thereof a crescent shaped filler plate 12.

On one side of the plate 5 there is mounted an apertured disk 13 while a similar apertured disk 14 is mounted in facial contact with the filler plate 12 and the plate 9.

A pin or shaft 15 passes through the disks 13 and 14 and plate 5 and has indicating hands 16 and 17 secured thereon in spaced relation to the disks 13 and 14.

Secured to the shaft 15 and housed between the plate 5 and disk 14 there is a small gear 18 which meshes with the segmental gear 11.

The pin 15 has the ends thereof swaged or headed to hold the device in assembly.

The operation of the device is thought to be manifest, but may be briefly described as follows:

A portion of electric conducting wire or cable is placed between the V-shaped notched jaws 6 and 10. The jaws 6 and 10 are then swung into contact with the cable thereby actuating the indicating hands 16 and 17 through the gears 11 and 18. The diameter of the wire or conduit may then be ascertained by reading the calibrations on the disks 13 and 14.

Although I have shown and described herein a preferred embodiment of my invention, it is to be definitely understood that I do not desire to limit the application of the invention thereto, and any change or changes may be made in the materials and in the structure and arrangement of the parts, within the spirit of the invention as claimed.

What is claimed is:

A gauge of the class described, said gauge comprising a first jaw member composed of a flat plate comprising a substantially circular portion and an elongated jaw extending from said circular portion, a second jaw member consisting of a flat plate comprising a rounded portion provided with gear teeth and another portion constituting a jaw for cooperating with the jaw of the first jaw member, a rotatable shaft passing through the center of the circular portion of the first jaw member, a pinion fixed on an intermediate part of said shaft and meshing with the gear teeth of the second jaw member, a pair of circular plates engaging the outer faces of the circular portion of the first jaw member and of the rounded portion of the second jaw member, respectively, at least one of said circular plates being traversed by said shaft, a filler plate positioned between the circular portion of the first jaw member and the adjacent one of said circular plates, said filler plate being located on the opposite side of said pinion from the second jaw member, said filler plate comprising arms projecting on opposite sides of said pinion and the adjacent gear tooth-equipped portion of said second jaw member so as to form an enclosed space for protected movement of the pinion and the adjacent portion of the second jaw member, a pivot pin passing through the two circular plates, the circular portion of the first jaw member and through the tooth-equipped portion of the second jaw member and forming a pivot for the second jaw member, the outer face of one of the circular plates having a dial thereon, and a pointer fixed on the adjacent end of said shaft for moving over the dial when one jaw member is moved relative to the other.

LOUIS OBOLER.